United States Patent
Chiu et al.

(10) Patent No.: US 12,234,814 B2
(45) Date of Patent: Feb. 25, 2025

(54) GUIDANCE UNIT (MK-1) AND ARCWING CIRCULATING POWER GUIDANCE SYSTEM WITH THE GUIDANCE UNIT (MK-1)

(71) Applicant: Tunghai University, Taichung (TW)

(72) Inventors: Kuo-wei Chiu, Taichung (TW); Chia-An Yeh, Zhubei (TW)

(73) Assignee: Tunghai University, Taichung (TW)

(*) Notice: Subject to any disclaimer, the term of this patent is extended or adjusted under 35 U.S.C. 154(b) by 522 days.

(21) Appl. No.: 17/673,565

(22) Filed: Feb. 16, 2022

(65) Prior Publication Data

US 2023/0235973 A1     Jul. 27, 2023

(30) Foreign Application Priority Data

Jan. 24, 2022 (TW) .................... 111102899

(51) Int. Cl.
| | |
|---|---|
| *F04B 11/00* | (2006.01) |
| *F04B 43/08* | (2006.01) |
| *F15D 1/02* | (2006.01) |
| *F16L 27/08* | (2006.01) |
| *F16L 55/07* | (2006.01) |
| *F17D 1/07* | (2006.01) |

(52) U.S. Cl.
CPC .......... *F04B 11/0091* (2013.01); *F04B 43/08* (2013.01); *F04B 43/084* (2013.01); *F04B 43/088* (2013.01); *F15D 1/02* (2013.01); *F15D 1/025* (2013.01); *F16L 27/0841* (2013.01); *F16L 55/07* (2013.01); *F17D 1/07* (2013.01)

(58) Field of Classification Search
CPC ............... F16L 55/027; F16L 55/02727; F16L 55/02718
USPC ......................... 138/39, 40, 44, 177, DIG. 11
See application file for complete search history.

(56) References Cited

U.S. PATENT DOCUMENTS

| | | | | |
|---|---|---|---|---|
| 1,744,842 A * | 1/1930 | Suverkrop | ............ | F16L 55/027 138/44 |
| 2,914,915 A * | 12/1959 | Sziklas | .................. | F02K 1/822 138/44 |
| 3,733,902 A * | 5/1973 | Halmi | ....................... | G01F 1/44 138/44 |
| 3,774,645 A * | 11/1973 | Pompa | ...................... | G01F 1/44 138/44 |
| 3,894,562 A * | 7/1975 | Moseley, Jr. | ............. | F15D 1/02 138/44 |
| 6,024,129 A * | 2/2000 | Schima | ................. | B05B 7/1472 138/40 |

(Continued)

*Primary Examiner* — Patrick F Brinson
(74) *Attorney, Agent, or Firm* — GUICE PATENTS PLLC

(57) ABSTRACT

A guidance unit comprises a first pipe part and a second pipe part, an inner space diameter of the second pipe part is smaller than an inner space diameter of the first pipe part, causing a cross-sectional area of a second flow space perpendicular to a pipe axis of the second pipe part smaller than that of a first flow space perpendicular to a pipe axis of the first pipe part; one end of the pipe axis of the second pipe part and one end of the pipe axis of the first pipe part are connected in series with each other and spaced apart from each other by a first angle, so that the second flow space communicates with the first flow space; thereby, a pressure of an external fluid in the second flow space is greater than a pressure of the external fluid in the first flow space.

28 Claims, 12 Drawing Sheets

(56) References Cited

U.S. PATENT DOCUMENTS

| | | | |
|---|---|---|---|
| 2005/0045239 A1* | 3/2005 | Krieger | B62D 5/062 138/44 |
| 2007/0157986 A1* | 7/2007 | Lammers | A61M 5/16877 138/40 |
| 2008/0169035 A1* | 7/2008 | Bivin | G05D 7/0186 366/337 |
| 2016/0123357 A1* | 5/2016 | Oun | F02D 9/1035 29/890.08 |

* cited by examiner

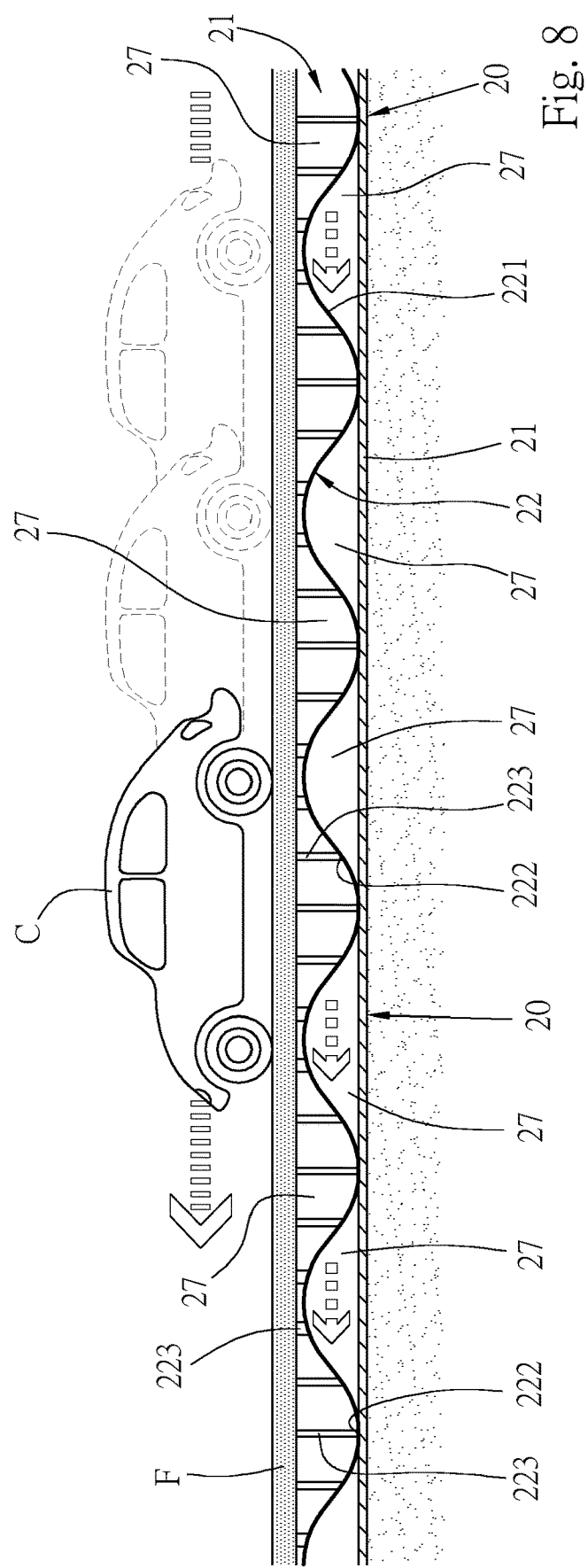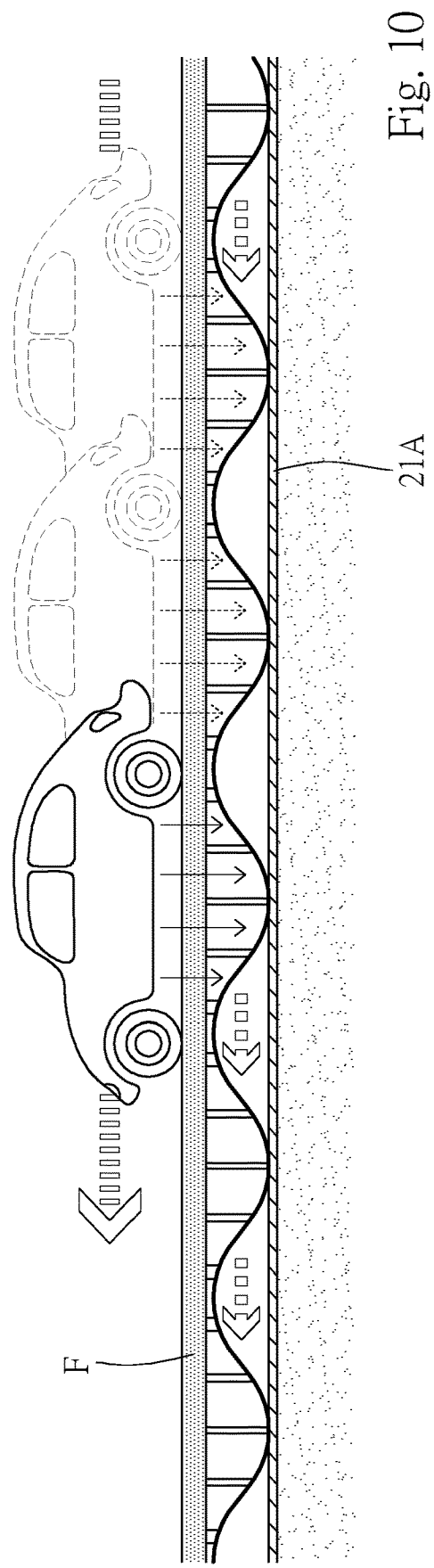

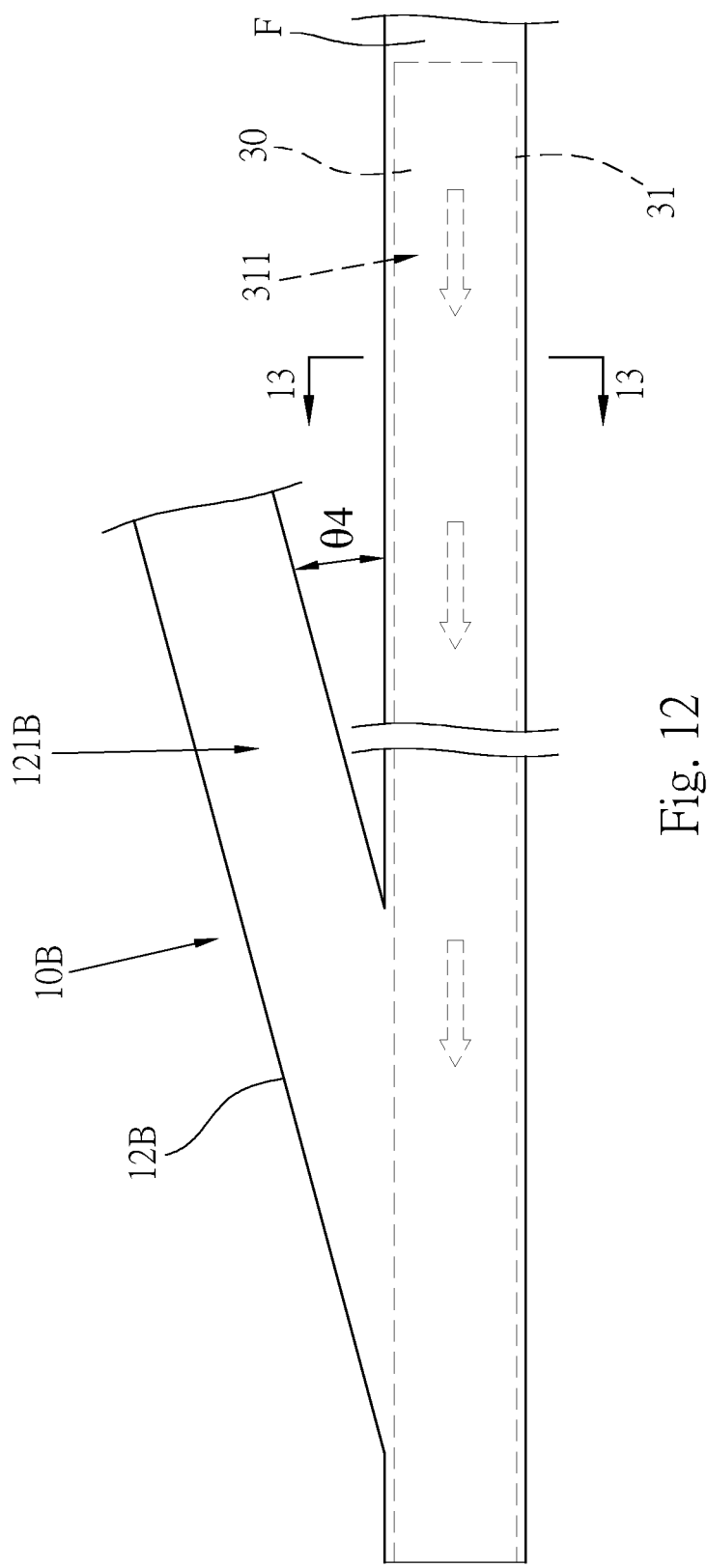

GUIDANCE UNIT (MK-1) AND ARCWING CIRCULATING POWER GUIDANCE SYSTEM WITH THE GUIDANCE UNIT (MK-1)

BACKGROUND OF THE INVENTION

Field of Invention

The invention is related to heat dissipation technology, and more particularly to a guidance unit (MK-1) and an arcwing circulating power guidance system with the guidance unit (MK-1).

Related Art

According to the relevant reports of the World Meteorological Organization (WMO), the average temperature has risen by 1.1° C. in recent years due to global climate change. Moreover, in the United Nations Framework Convention on Climate Change (UNFCCC), climate change is mainly caused by changes in atmospheric composition due to human activities.

The heat wave phenomenon in the climatic anomaly refers to the continuous abnormal high temperature and/or humidity compared with the average value of the past years for a certain period of time. Since the comfortable temperature for the human body is between 18° C. and 28° C. and the relative humidity is 40% to 70%, if the temperature exceeds 35° C., the regulating function of the human body will fail, which may easily lead to heat stroke or even death. Furthermore, the UN Intergovernmental Panel on Climate Change (IPCC) pointed out in the fifth assessment report in 2014 that it is predicted that the heat wave phenomenon in the future will likely occur with a higher frequency and will last for a long time, and the temperature will even exceed 39° C.

Furthermore, the urban heat island effect means that the temperature of the city is higher than that of the surrounding areas of the city, particularly the hot spots are mainly concentrated in the city center to form a regional climate phenomenon. It has been confirmed that the heat island effect is mainly caused by human activities that have greatly changed the original state of the earth's surface. For example, the land has been artificially developed and utilized, and the vegetation area has been greatly reduced.

Therefore, how to provide an urban heat dissipation or cooling system to improve the aforementioned problems of the heat island effect will be a subject that relevant practitioners need to consider.

SUMMARY OF THE INVENTION

Therefore, a main object of the invention is to provide a guidance unit (MK-1) and an arcwing circulating power guidance system with the guidance unit (MK-1) capable of transferring the heat trapped in a city caused by the heat island effect from the city center with a higher temperature to a suburb with a relatively lower temperature in order to relieve the discomfort caused by the heat island effect and to achieve an object of cooling.

In order to achieve the above-mentioned object, the guidance unit provided by the invention comprises a first pipe part and a second pipe part, wherein an inner space of the first pipe part is defined with a first flow space extending along a pipe axis of the first pipe part, an inner space of the second pipe part is defined with a second flow space extending along a pipe axis of the second pipe part, and an inner space diameter of the second pipe part is smaller than an inner space diameter of the first pipe part, causing a cross-sectional area of the second flow space in a direction perpendicular to the pipe axis of the second pipe part smaller than a cross-sectional area of the first flow space in a direction perpendicular to the pipe axis of the first pipe part; one end of the pipe axis of the second pipe part and one end of the pipe axis of the first pipe part are connected in series with each other and spaced apart from each other by a first angle, so that the second flow space and the first flow space communicate with each other in series; thereby, a pressure of an external fluid located in the second flow space is greater than a pressure of the external fluid located in the first flow space to cause the external fluid to flow continuously from the second flow space to the first flow space.

Further, the first angle is between 15° and 180°.

On the other hand, main technical features of the arcwing circulating power guidance system provided by the invention lie in comprising a first guidance unit and a second guidance unit, the first guidance unit and the second guidance unit respectively comprising the first pipe part and the second pipe part, and the second guidance unit being communicated in series with the first guidance unit.

In one embodiment, another end of the pipe axis of the first pipe part of the second guidance unit and another end of the pipe axis of the second pipe part of the first guidance unit are connected in series with each other and spaced apart from each other by a second angle, so that the first flow space of the second guidance unit and the second flow space of the first guidance unit communicate with each other in series.

Further, the second angle is between 15° and 180°.

In one embodiment, a cross-sectional area of the first flow space of the second guidance unit in a direction perpendicular to the pipe axis of the first pipe part is smaller than a cross-sectional area of the first flow space of the first guidance unit in a direction perpendicular to the pipe axis of the first pipe part, and a cross-sectional area of the second flow space of the second guidance unit in a direction perpendicular to the pipe axis of the second pipe part is smaller than a cross-sectional area of the second flow space of the first guidance unit in a direction perpendicular to the pipe axis of the first pipe part.

In order to enhance a flow efficiency of the external fluid, the arcwing circulating power guidance system of the invention further comprises a first passive booster unit having a third pipe part and a movable part, wherein an inner space of the third pipe part is defined with a third flow space extending along a pipe axis of the third pipe part, and the third flow space communicates with either the first guidance unit or the second guidance unit; the movable part is movably disposed in the third pipe part to partition the third flow space into at least two fluid temporary retaining areas; wherein when the movable part is acted on by an external force, the movable part displaces and actuates relative to the third pipe part and changes a space size of the at least two fluid temporary retaining areas in order to drive the external fluid located in the fluid temporary retaining areas to flow.

Wherein the movable part comprises a body part, a plurality of first connecting parts and a plurality of first elastic members, wherein the body part is made of a flexible material and has an elongated sheet structure, and extends along the pipe axis direction of the third pipe part; the first connecting parts are respectively disposed on the body part at intervals along the pipe axis direction of the third pipe part; the first elastic members are respectively bridged at intervals between each of the first connecting parts and the third pipe part, through changes of an elastic force of the first elastic members, the body part is forced to bend to form a continuous wavy structure along a cross section of the pipe axis direction of the third pipe part, and at the same time, portions of the body part at troughs of the wavy shape are respectively attached on an inner wall surface of the third pipe part, thereby the fluid temporary retaining areas are partitioned; wherein when each of the first elastic members is acted on by an external force, an elastic state of each of the first elastic members is changed to cause each of the first connecting parts to displace linearly back and forth between a first position and a second position, so that the body part partially displaces and actuates relative to the third pipe part, thereby changing a space size of the corresponding fluid temporary retaining area.

In one embodiment, the first passive booster unit further comprises a first air inlet, a foldable member, a second connecting part and an elastic member, wherein the first air inlet is opened on the third pipe part along the pipe axis direction of the third pipe part; the foldable member is capable of covering the first air inlet by opening and closing, so that the first air inlet has a communicated state and a closed state, when the first air inlet is adjusted from the closed state to the communicated state, the external fluid is enabled to enter into the fluid temporary retaining area through the first air inlet; the second connecting part is spaced apart from the first connecting parts and disposed on the body part along the pipe axis direction of the third pipe part; the elastic member is bridged between the foldable member and the second connecting part.

In one embodiment, the first passive booster unit further comprises a second air inlet away from the first air inlet and disposing on the third pipe part, so that an inside of the third pipe part is normally communicated with the outside.

In one embodiment, the arcwing circulating power guidance system of the invention further comprises a second passive booster unit having a fourth pipe part and a plurality of second elastic members, wherein an inner space of the fourth pipe part is defined with a fourth flow space extending along a pipe axis of the fourth pipe part, and the fourth flow space communicates with either the first guidance unit or the second guidance unit; the second elastic members are respectively disposed in the fourth pipe part at intervals along a radial direction of the fourth pipe part; wherein when each of the second elastic members is acted on by an external force to oscillate, each of the second elastic members is capable of transmitting a kinetic energy to the external fluid around each of the second elastic members to cause fluctuation, and the external fluid in the fourth flow space is caused to flow with changes of fluctuation.

Further, the fourth pipe part has a top wall and a bottom wall connected to the top wall, and a vertical distance between the bottom wall and the top wall gradually increases from two sides of the bottom wall toward a central portion of the bottom wall.

Wherein each of the second elastic members is a rope-like structure, and two ends thereof are respectively connected to the top wall and the bottom wall.

In one embodiment, the second elastic members are arranged in sequence from a side edge of the bottom wall to the central portion of the bottom wall in a descending order according to an elastic capacity of the second elastic members.

In one embodiment, the second passive booster unit further comprises a first air inlet, a foldable member and an elastic member, wherein the first air inlet is opened on the fourth pipe part along a pipe axis direction of the fourth pipe part; the foldable member is capable of covering the first air inlet by opening and closing, so that the first air inlet has a communicated state and a closed state, when the first air inlet is adjusted from the closed state to the communicated state, the external fluid is enabled to enter into the fourth flow space through the first air inlet; the elastic member is bridged between the foldable member and an inner wall surface of the bottom wall.

In one embodiment, the second passive booster unit further comprises a second air inlet away from the first air inlet and disposing on the fourth pipe part, so that the fourth pipe part is normally communicated with the outside.

BRIEF DESCRIPTION OF THE DRAWINGS

FIG. 8 is a cross-sectional view of FIG. 7 along section line 8-8.

FIG. 10 is a schematic diagram of a fourth embodiment of the invention.

FIG. 12 is a schematic diagram of a second passive booster unit of a fifth embodiment of the invention being installed on a city road at ground level.

DETAILED DESCRIPTION OF THE INVENTION

Figure 1:
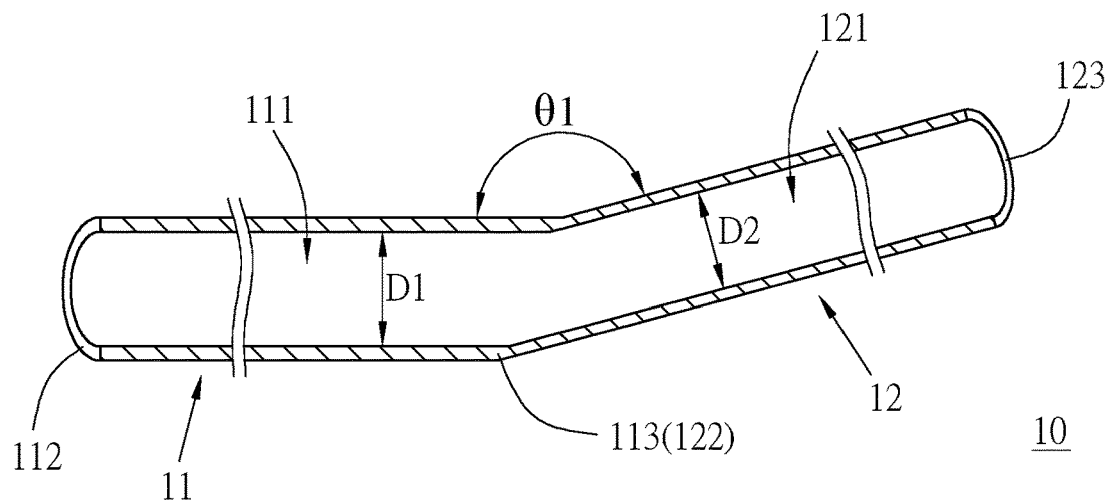
FIG. 1 is a schematic diagram of a guidance unit in a first embodiment of the invention.

Please refer to FIG. 1, an arcwing circulating power guidance system disclosed in a first embodiment of the invention mainly comprises a guidance unit 10, identification of biological functions and biomimicry design and development of biological structures for the guidance unit 10 was first carried out and completed independently by Professor CHIU Kuo-Wei from the Department of Architecture of Tunghai University of Taiwan, and then was delivered to the graduate student Yeh Chia-An to instruct her to carry out the structural design test and functional design confirmation of the guidance unit of model ArcWing-MK1™.

Specifically, the guidance unit 10 comprises a first pipe part 11 and a second pipe part 12, wherein an inner space of the first pipe part 11 is defined with a first flow space 111 extending along a pipe axis of the first pipe part 11, an inner space of the second pipe part 12 is defined with a second flow space 121 extending along a pipe axis of the second pipe part 12, and an inner space diameter D2 of the second pipe part 12 is smaller than an inner space diameter D1 of the first pipe part 11, causing a cross-sectional area of the second flow space 121 in a direction perpendicular to the pipe axis of the second pipe part 12 smaller than a cross-sectional area of the first flow space 111 in a direction perpendicular to the pipe axis of the first pipe part 11. In this embodiment, the first pipe part 11 and the second pipe part 12 are respectively a tubular structure and have different pipe diameters, two ends of the pipe axis of the first pipe part 11 are respectively a first end 112 and a second end 113, and two ends of the pipe axis of the second pipe part 12 are respectively a first end 122 and a second end 123.

Figure 2:
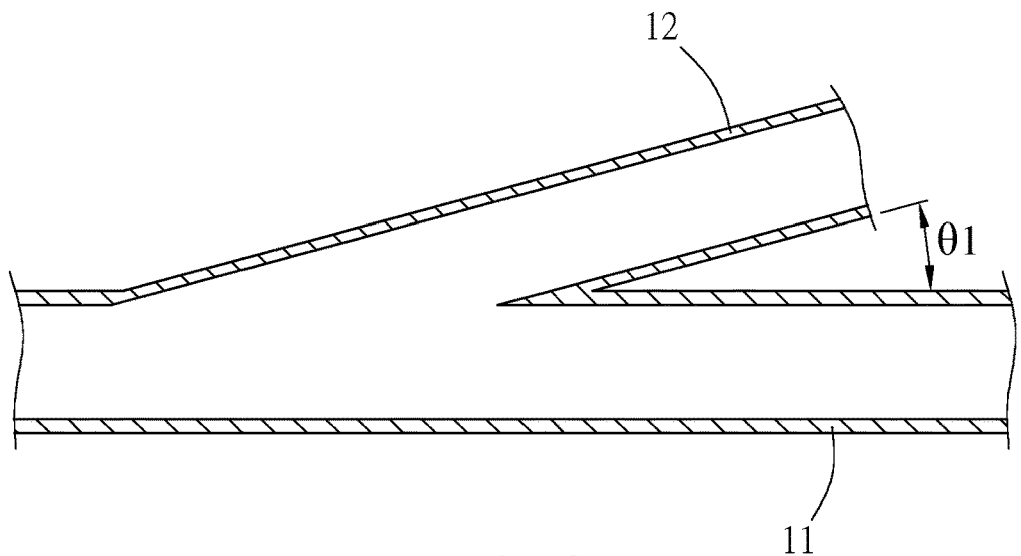
FIG. 2 is a schematic diagram of another embodying mode of the guidance unit of FIG. 1, which shows an included angle 15° between two pipe parts.
Figure 3:
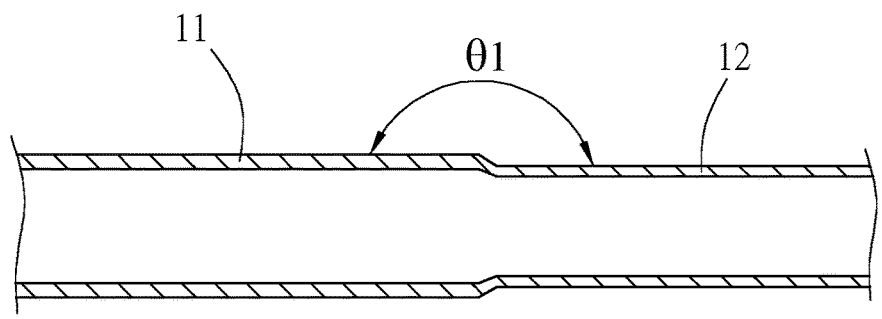
FIG. 3 is a schematic diagram of yet another embodying mode of the guidance unit of FIG. 1, which shows an included angle 180° between the two pipe parts.

Furthermore, the first end 122 of the second pipe part 12 and the second end 113 of the first pipe part 11 are connected in series with each other and spaced apart from each other by a first angle θ1, so that the second flow space is 121 and the first flow space 111 communicate with each other in series, wherein since the first pipe part 11 and the second pipe part 12 can have different converge patterns, the first angle θ1 can be between 15° and 180°; for example, in FIG. 1, the first angle θ1 is 165°, in FIG. 2, the first angle θ1 is 15°, and in FIG. 3, the first angle θ1 is 180°. Preferably, the first angle θ1 is between 15° and 60°. More preferably, the first angle θ1 is between 15° and 40°.

With the composition of the above-mentioned components, specific implementation steps of the first embodiment of the invention are as follows: firstly, with the different cross-sectional areas of the first flow space 111 and the second flow space 121 formed by a difference in the pipe diameters between the first pipe part 11 and the second part portion 12, when a fluid with a same volume flow passes through the first flow space 111 and the second flow space 121, a pressure will be inversely proportional to a size of the cross-sectional area, that is, a pressure of an external fluid located in the second flow space 121 is greater than a pressure of the external fluid located in the first flow space 111 to cause the external fluid to flow continuously from the second flow space 121 to the first flow space 111.

Furthermore, since the second pipe part 12 is substantially located above the first pipe part 11, and an included angle between the second pipe part 12 and the first pipe part 11 is the first angle θ1, wherein, in particular, when the first angle θ1 is 15° or 165°, which are supplementary angles to each other as shown in FIG. 1 and FIG. 2, during a process of the external fluid flowing from the second flow space 121 to the first flow space 111, a momentum for the external fluid to converge downward is further generated under the action of gravity, the momentum can be used as a motive power to assist the external fluid to flow from the second pipe part 12 to the first pipe part 11. In other words, since the included angle between the first pipe part 11 and the second pipe part 12 is the first angle θ1, a pressure gradient can be formed between the first pipe part 11 and the second pipe part 12, since there is a considerable pressure difference, the external fluid will flow from a position with a high pressure to a position with a low pressure. Therefore, under the action of the pressure gradient, the external fluid is continuously driven and its flow rate is accelerated to achieve an object of continuous flow to prevent the external fluid from staying in the guidance unit 10.

Figure 4:
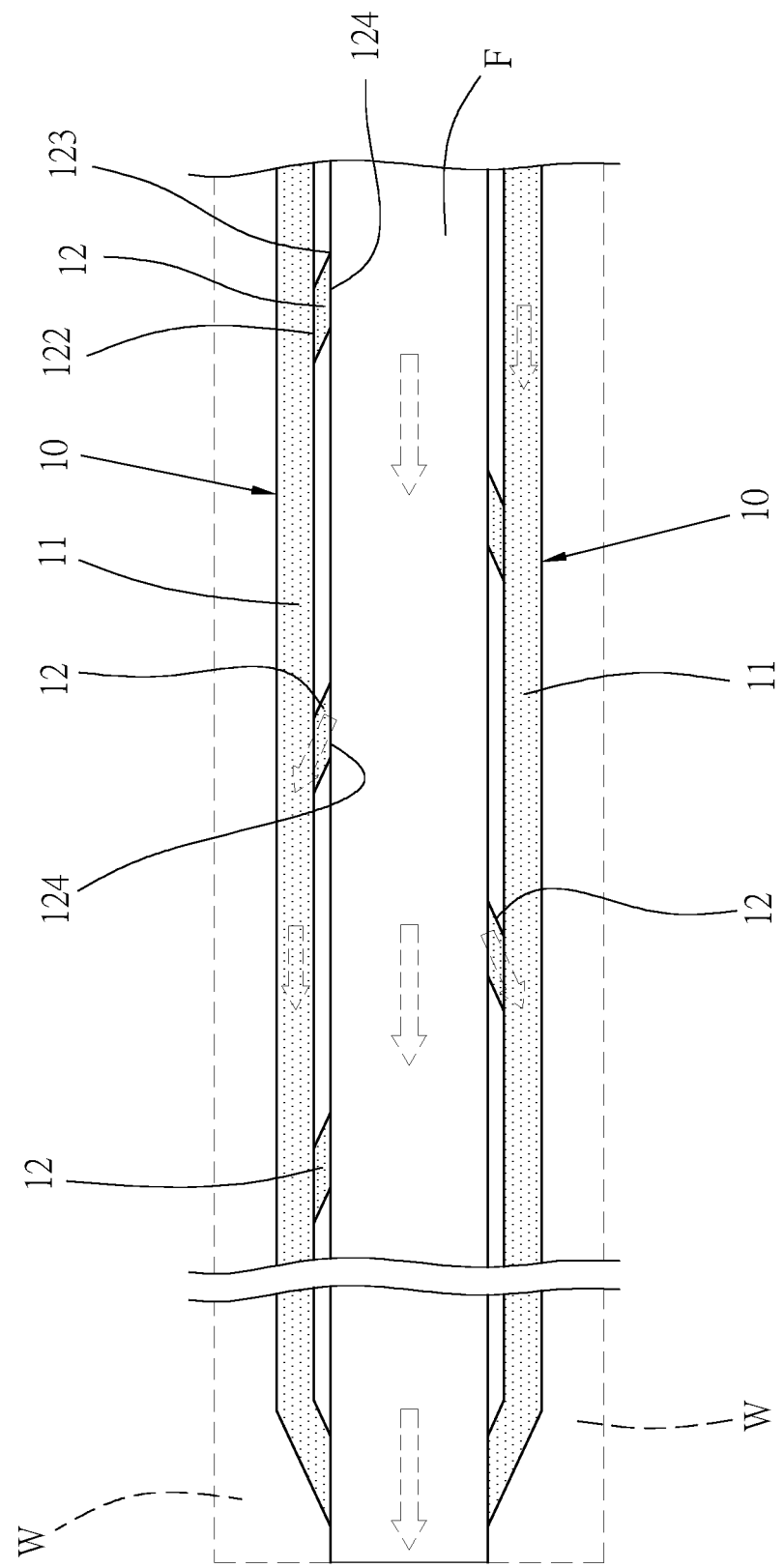
FIG. 4 is a schematic diagram of the guidance unit of the first embodiment of the invention being installed on a city road at ground level.

As shown in FIG. 4, in a practical application of the invention, the guidance unit 10 is buried under a city road at ground level, preferably buried under sidewalks W on two sides of a vehicle road F, and sizes of the pipe diameters of the first pipe part 11 and the second pipe part 12 can be set according to a width of the sidewalk W, and the first pipe part 11 and the second pipe part 12 have an appropriate pipe wall thickness to maintain its structural strength. Furthermore, a quantity of the second pipe part 12 is three, and the first ends 122 of the second pipe parts 12 are respectively connected to one side of a pipe body of the first pipe part 11 at intervals, and the second end 123 of each of the second pipe parts 12 is correspondingly disposed at a junction between the vehicle road F and the sidewalks W, and is provided with an opening 124 communicating with the outside for receiving an airflow formed by a moving vehicle.

Figure 5:
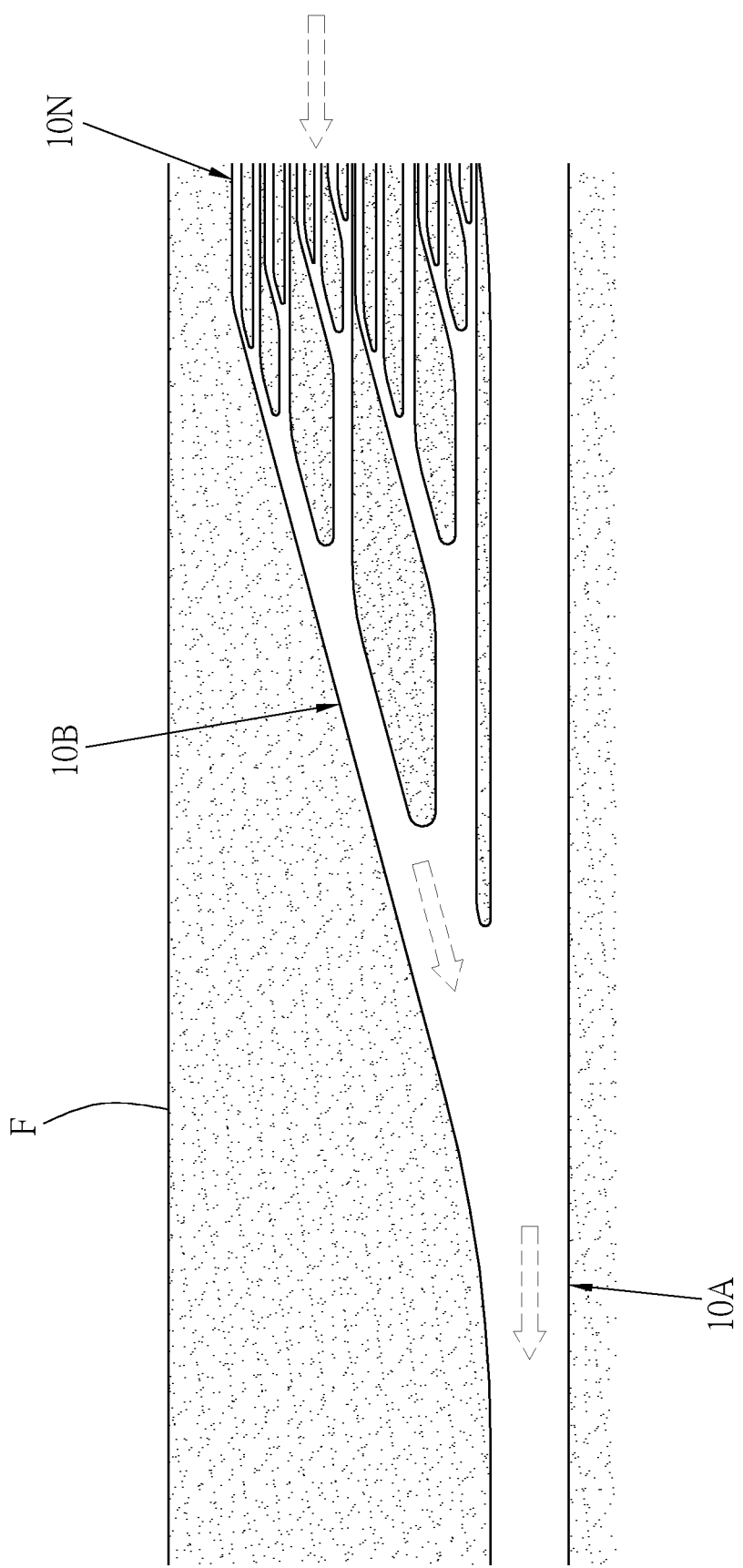
FIG. 5 is a schematic diagram of a second embodiment of the invention.
Figure 6:
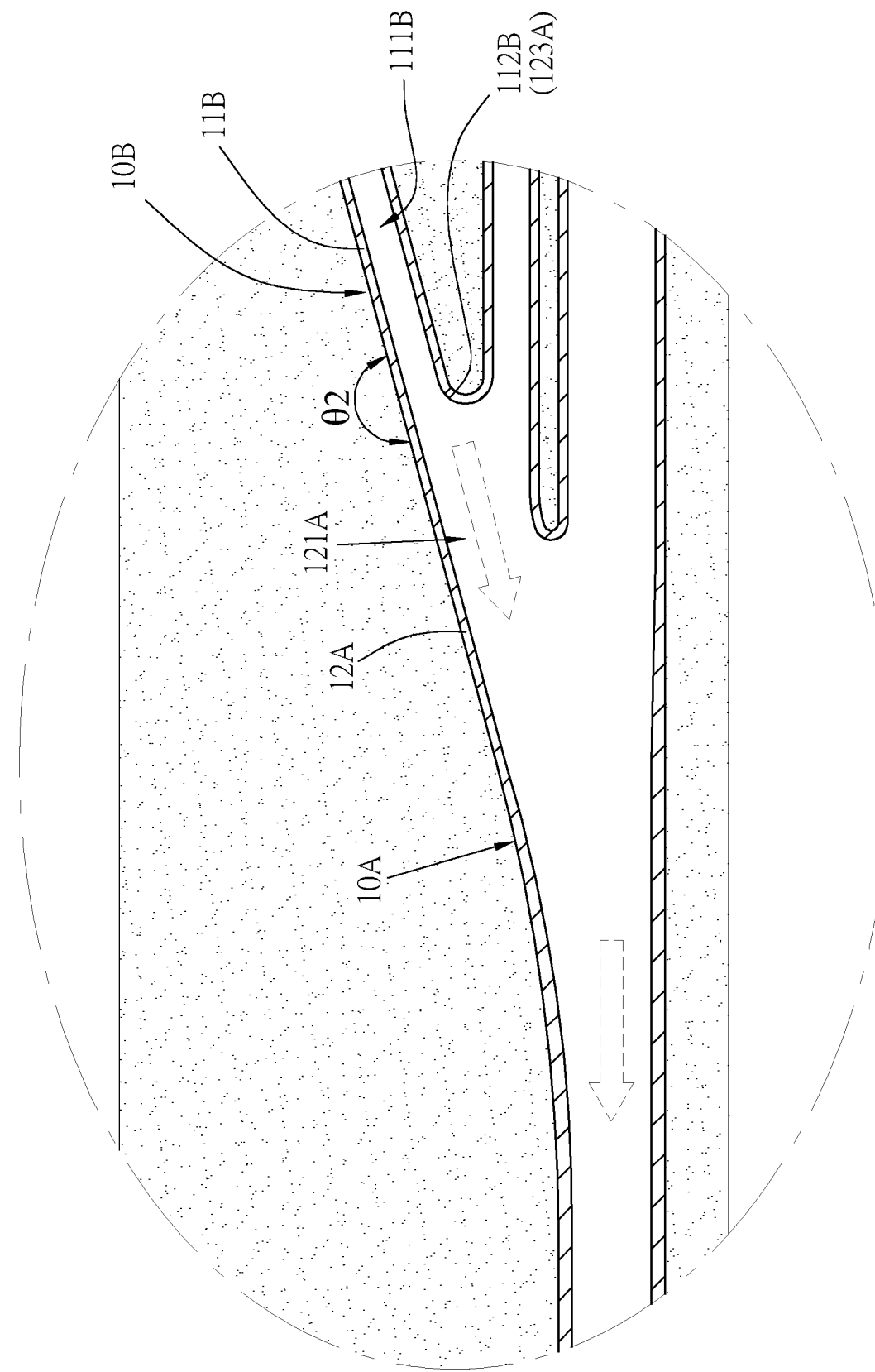
FIG. 6 is a partial enlarged view of FIG. 5.

As shown in a second embodiment of the invention in FIG. 5 and FIG. 6, main differences between the second embodiment and the first embodiment are that the arcwing circulating power guidance system has a plurality of guidance units from a first to a Nth natural number, inner diameters of pipe parts comprised in each of the guidance units decrease in sequence, and the pipe parts are sequentially connected in series with one another in a tree-like radial branching manner to form a multi-level network structure. In this embodiment, the guidance units are respectively located at different depths below a road surface, wherein the pipe part with a smaller inner diameter is closer to the road surface, and the pipe part with a larger inner diameter is away from the road surface. In other embodiments, the guidance units can also be disposed on a same level.

Taking the serial communication mode between a first guidance unit 10A and a second guidance unit 10B as an example, a first end 112B of a first pipe part 11B of the second guidance unit 10B and a second end 123A of a second pipe part 12A of the first guidance unit 10A are connected in series with each other and spaced apart from each other by a second angle θ2, so that a first flow space 111B of the second guidance unit 10B and a second flow space 121A of the first guidance unit 10A communicate with each other in series. In this embodiment, a range of the second angle θ2 is between 15° and 180°, so as to avoid or reduce a turbulence phenomenon occurring when two external fluids converge with each other, and to prevent reverse flow from occurring, and at the same time, through a momentum generated during confluence of the two external fluids, the converged external fluid is capable of flowing continuously. Wherein, in this embodiment, the second angle θ2 is 180°, as shown in FIG. 6.

In particular, if the second angle θ2 is selected to be between 15° and 60°, more preferably, the second angle θ2 is selected to be between 15° and 40°, a pressure gradient can be formed between the first guidance unit 10A and the second guidance unit 10B, under the influence of the pressure gradient, the converged external fluid is continuously driven and its flow rate is accelerated to achieve an object of continuous flow to prevent the converged external fluid from staying in the first guidance unit 10A and the second guidance unit 10B.

Inner diameters of the pipe parts comprised in the second guidance unit 10B are relatively smaller than or equal to inner diameters of the pipe parts comprised in the first guidance unit 10A, through a difference in size between the pipe parts of the second guidance unit 10B connected with the pipe parts of the first guidance unit 10A, a pressure difference is formed therebetween, so that the external fluid is capable of smoothly flowing from the second guidance unit 10B into the first guidance unit 10A.

For example, a cross-sectional area of the first flow space 111B of the second guidance unit 10B in a direction perpendicular to a pipe axis of the first pipe part 11B is smaller than a cross-sectional area of a first flow space 111A of the first guidance unit 10A in a direction perpendicular to a pipe axis of the first pipe part 11A, and a cross-sectional area of a second flow space 121B of the second guidance unit 10B in a direction perpendicular to a pipe axis of a second pipe part 12B is smaller than a cross-sectional area of the second flow space 121A of the first guidance unit 10A in a direction perpendicular to the pipe axis of the first pipe part 11A.

Accordingly, through the composition of the above-mentioned components, a specific implementation mode of the second embodiment of the invention utilizes a pressure difference between the two interconnected guidance units caused by a difference in the pipe diameters to force a plurality of external fluids to flow in the guidance units respectively, and the two external fluids superimpose at a junction to converge into a larger momentum, and finally converge and flow into the first guidance unit 10A to achieve an object of being driven to flow continuously. In particular, the design of the multi-level network structure is derived from the butterfly thermoregulatory system, which means that the multi-level network structure is similar to the vasculature on the wings of butterfly for transporting gas and hemolymph, and capable of transferring heat to the abdomen to dissipate heat by evaporation.

In addition, in practical application, the invention can be configured along the existing main roads in a city, and can be extended, branched and/or expanded accordingly, so that the heat trapped in the city due to the heat island effect is capable of entering into the arcwing circulating power guidance system in the form of hot air, and is transferred from the city center with a higher temperature to a suburb with a relatively lower temperature in order to relieve the discomfort caused by the heat island effect and to achieve an object of cooling.

In addition, the invention can be integrated and expanded according to local topography, terrain, monsoon, river and other green natural resources, or large outdoor public spaces such as parks and football fields to enhance a cooling effect. For example, hot air is directed into a river and dissipated as water vapor.

Figure 7:
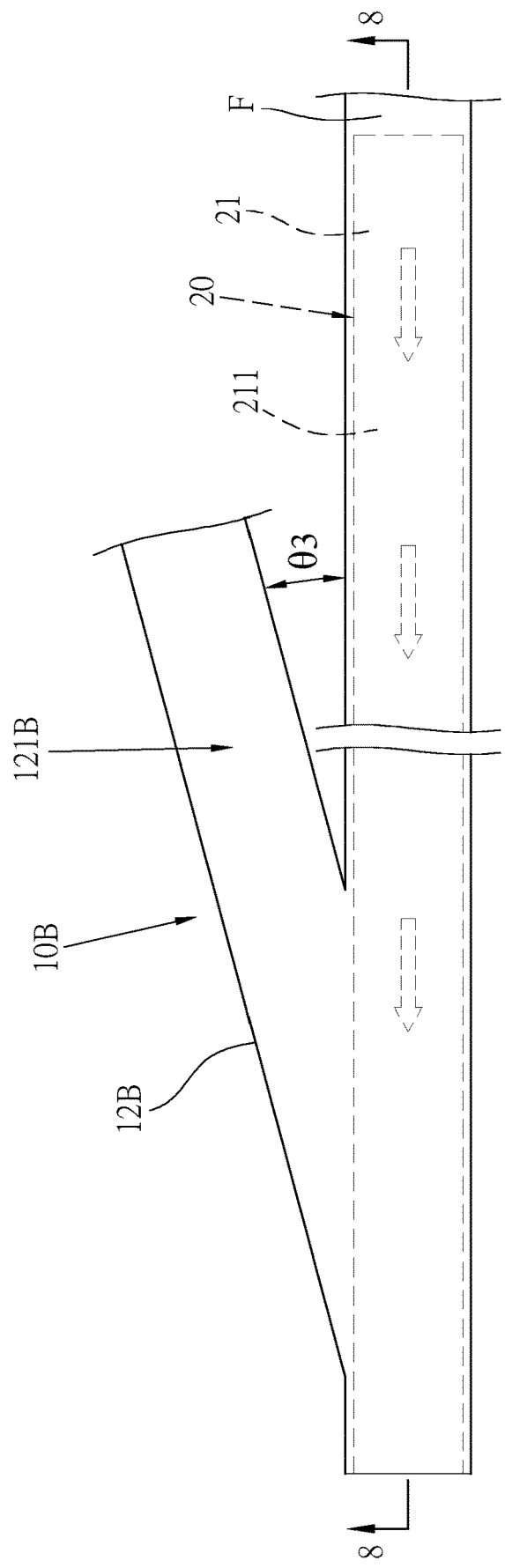
FIG. 7 is a schematic diagram of a first passive booster unit of a third embodiment of the invention being installed on a city road at ground level.

As shown in a third embodiment of the invention in FIG. 7 and FIG. 8, main differences between the third embodiment and the first embodiment are that the arcwing circulating power guidance system further comprises a first passive booster unit 20 using pumping to improve heat transfer efficiency. Its design concept is derived from the vasculature of butterfly, which drives the hemolymph circulation and transport through the contraction or relaxation of the pulse organ.

Specifically, the first passive booster unit 20 has a third pipe part 21 and a movable part 22, wherein an inner space of the third pipe part 21 is defined with a third flow space 211 extending along a pipe axis of the third pipe part 21. As shown in FIG. 8, in this embodiment, the third pipe part 21 is a tubular structure, and is buried under an urban road at ground level, preferably under the vehicle road F, a pipe diameter of the third pipe part 21 is set according to a width of the vehicle road F, and the third pipe part 21 has an appropriate pipe wall thickness to maintain its structural strength.

Furthermore, the third pipe part 21 can be connected to one of the guidance units shown in FIG. 5 to speed up a flow rate of an external fluid. For example, as shown in FIG. 7, the third pipe part 21 is connected in series with the second guidance unit 10B, so that the third flow space 211 and the second flow space 121B of the second guidance unit 10B communicate with each other in series. An inner space diameter of the third pipe part 21 is equal to or smaller than an inner space diameter of the second pipe part 12B, causing a cross-sectional area of the third flow space 211 in a direction perpendicular to the pipe axis of the third pipe part 21 equal to or smaller than a cross-sectional area of the second flow space 121B in a direction perpendicular to a pipe axis of the second pipe part 12B.

In addition, an included angle between the third pipe part 21 and the second pipe part 12B is a third angle θ3, wherein a range of the third angle θ3 is between 15° and 180°. In this embodiment, the third angle θ3 is 15°, as shown in FIG. 7.

In addition, the third angle θ3 is selected to be between 15° and 60°, more preferably, the third angle θ3 is between 15° and 40°. Likewise, under the influence of the pressure gradient, the external fluid is continuously driven to prevent the external fluid from staying in the guidance units.

The movable part 22 is movably disposed in the third pipe part 21 to partition the third flow space 211 into a plurality of fluid temporary retaining areas 27. In this embodiment, the movable part 22 comprises a body part 221, a plurality of first connecting parts 222 and a plurality of first elastic members 223, wherein the body part 221 is made of a flexible material and roughly in the shape of an elongated sheet, and extends along a pipe axis direction of the third pipe part 21. The first connecting parts 222 are respectively disposed on the body part 221 at intervals along the pipe axis direction of the third pipe part 21. The first elastic members 223 correspond to positions of the first connecting parts 222 and are arranged along the pipe axis direction of the third pipe part 21 at intervals, and each of the first elastic members 223 is an elastic rope with two ends respectively bridged on each of the first connecting parts 222 and an inner wall surface of the third pipe part 21. Through changes of an elastic force of the first elastic members 223, the body part 221 is forced to bend to form a continuous wavy structure along a cross section of the pipe axis direction of the third pipe part 21, and at the same time, portions of the body part 221 at troughs of the wavy shape are respectively attached on the inner wall surface of the third pipe part 21, thereby the fluid temporary retaining areas 27 are partitioned. In this embodiment, the continuous wavy structure is in the shape of a sine wave.

With the composition of the above-mentioned components, main implementation steps of the third embodiment of the invention are as follows.

Figure 9:
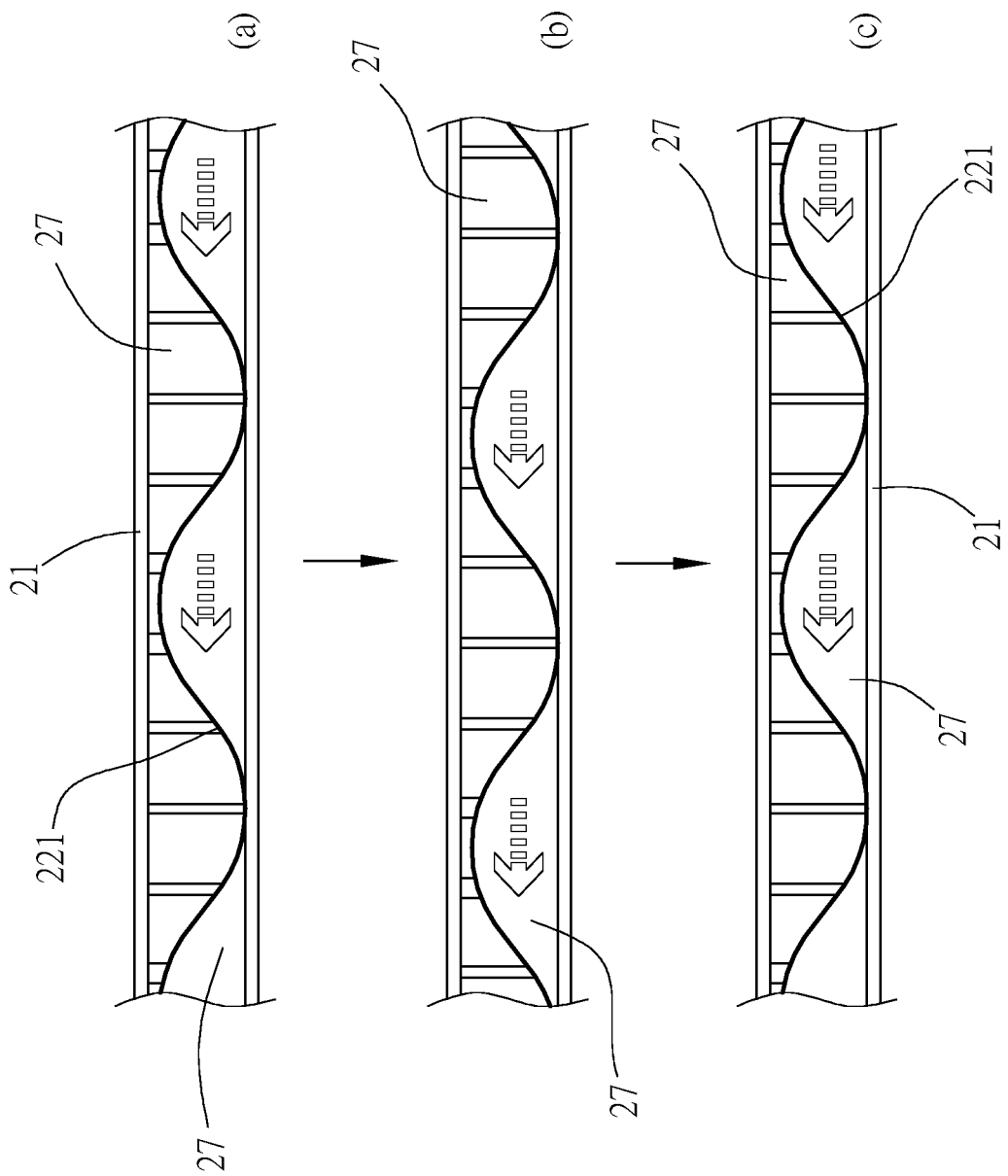
FIG. 9 is a partial enlarged view of FIG. 8, in which (a) to (c) sequentially show a process of a body part movements.

As shown in FIG. 8, when a vehicle C passes through the vehicle road F, a downward exerted force of the vehicle C through a wheel of the vehicle C will change an elastic state of the first elastic member 223, such as compressing or releasing, to cause the corresponding first connecting part 222 to displace linearly back and forth between a first position and a second position, so that the body part 221 partially displaces and actuates relative to the third pipe part 21, thereby changing a space size of the corresponding fluid temporary retaining area 27, as shown in FIG. 9. And during a changing process of the fluid temporary retaining area 27, the body part 221 will compress the external fluid located in the fluid temporary retaining areas 27 to generate a driving force to drive the external fluid to move forward.

Figure 11A:
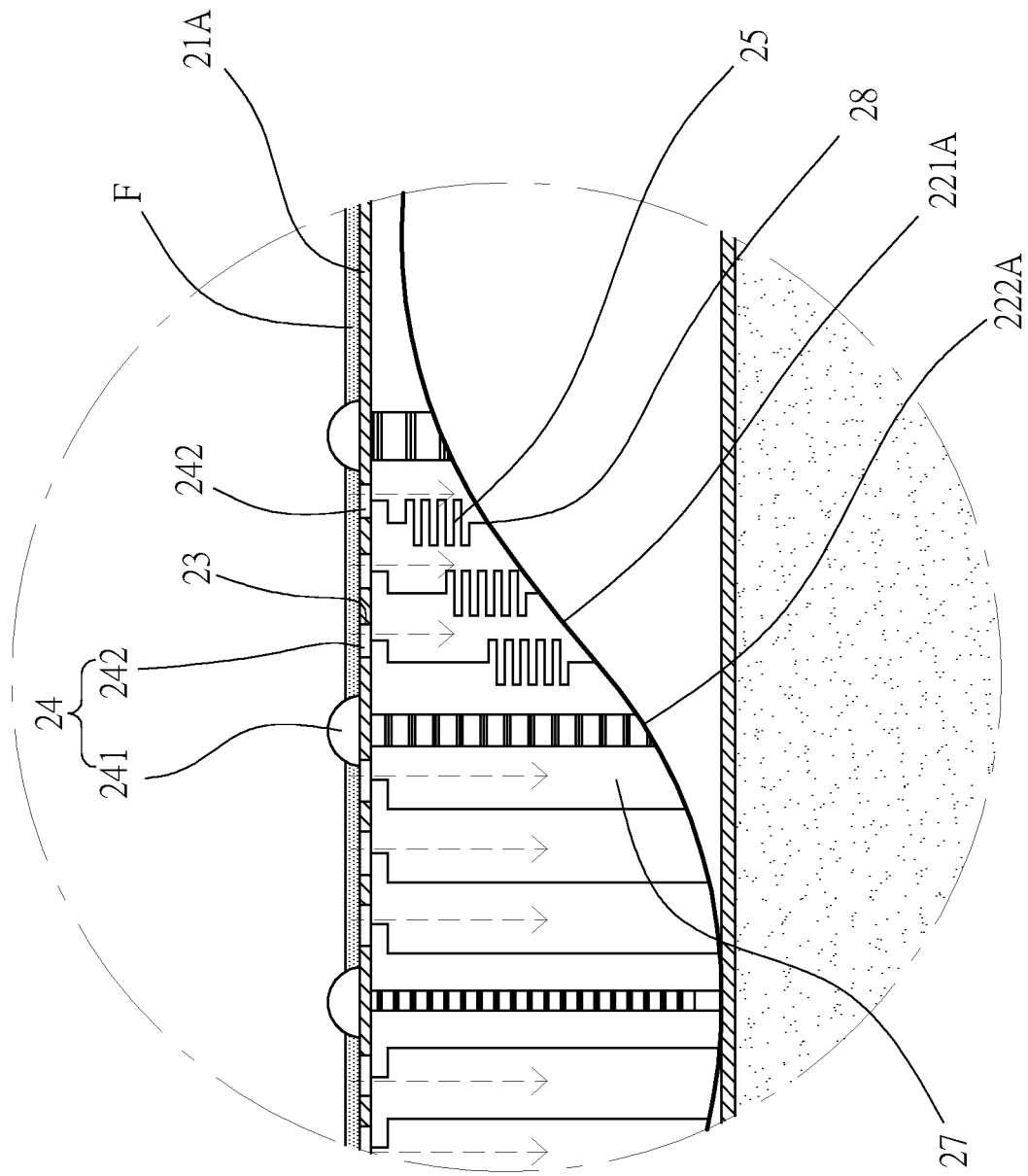
FIG. 11A is a partial enlarged view of FIG. 10, showing that a first air inlet is in a closed state.
Figure 11B:
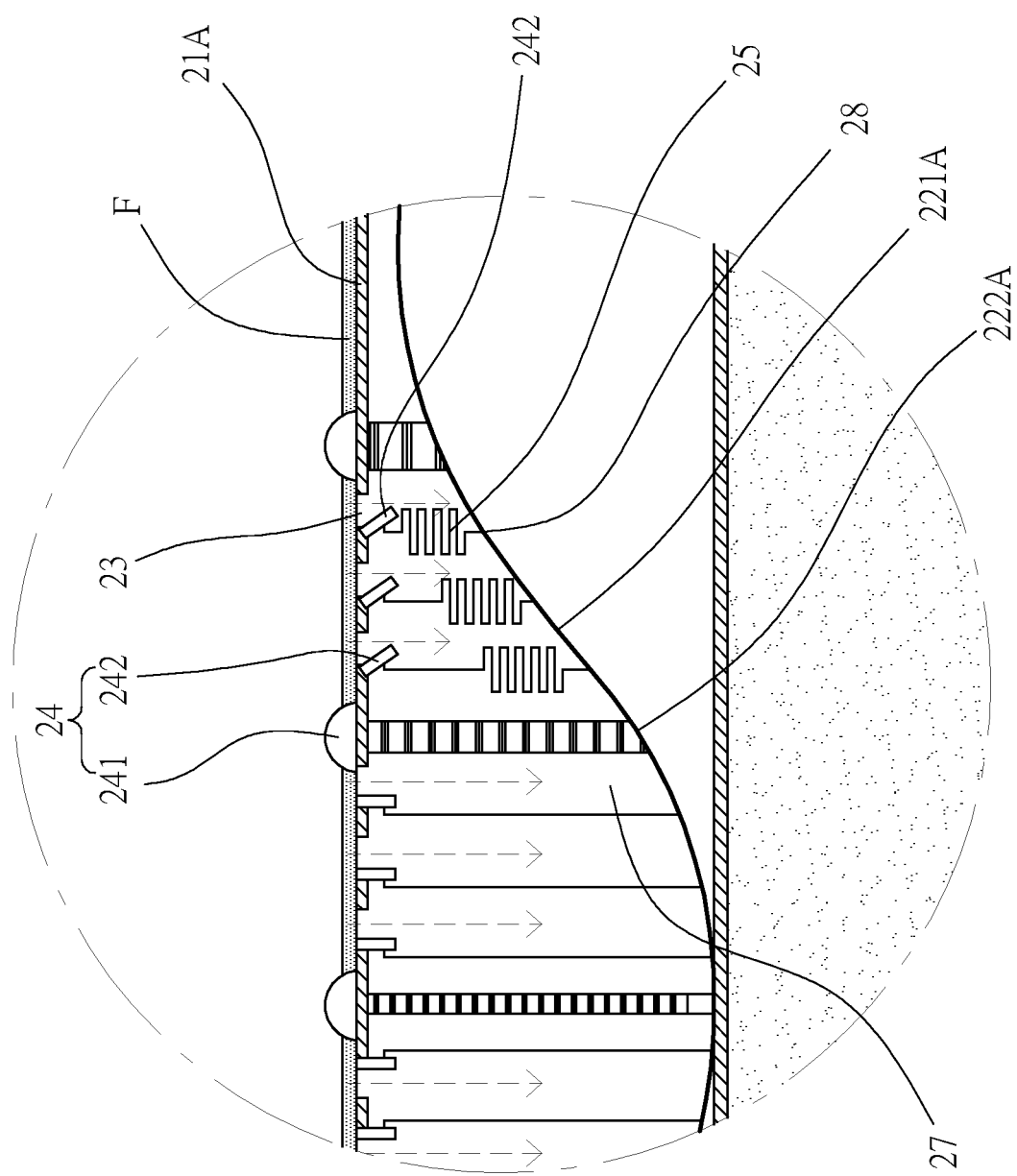
FIG. 11B is a diagram showing that the first air inlet of FIG. 11A is changed to a communicated state.

As shown in a fourth embodiment of the invention in FIG. 10 to FIG. 11B, main differences between the fourth embodiment and the third embodiment are that a first passive booster unit 20A further comprises a first air inlet 23, a foldable member 24, an elastic member 25, a second air inlet and a second connecting part 28, wherein the first air inlets 23 are respectively opened on a third pipe part 21A at intervals along a pipe axis direction of the third pipe part 21A, and are correspondingly opened on the vehicle road F to communicate with the outside.

As shown in FIG. 11A, the foldable member 24 has a force-receiving portion 241 and a closing portion 242. The force-receiving portion 241 is disposed on the vehicle road F and is connected with the closing portion 242 by a locking mechanism, so that the closing portion 242 can be in a locked state and a released state; however, the locking mechanism is a conventional technology, so it will not be described in detail. The closing portion 242 is capable of covering the first air inlet 23 by opening and closing, so that the first air inlet 23 has a communicated state and a closed state.

The second connecting part 28 is spaced apart from first connecting parts 222A and disposed on a body part 221A along the pipe axis direction of the third pipe part 21A.

The elastic member 25 is bridged between the closing portion 242 and the second connecting part 28. When a wheel of the vehicle C is pressed against the force-receiving portion 241, an external force is applied to the force-receiving portion 241, and the locking mechanism is actuated, and the closing portion 242 is changed from the locked state to the released state, so that the elastic member 25 is capable of pulling the closing portion 242 away from the first air inlet 23 partially, and the first air inlet 23 can be adjusted from the closed state to the communicated state, as shown in FIGS. 11A to 11B, the external fluid is enabled to enter into a fluid temporary retaining area 27A through the first air inlet 23. Conversely, when the vehicle C wheel leaves the foldable member 24, the closing portion 242 will return to an original position to close the first air inlet 23.

Furthermore, the second air inlet (not shown in the figures) is further opened on one side of the third pipe part 21, so that an inside of the third pipe part 21 is normally communicated with the outside, and the second air inlet is spaced apart from the first air inlet 23 by a predetermined distance to ensure an air intake efficiency of the first air inlet 23.

In addition, a quantity of the first air inlet 23, the foldable member 24, the elastic member 25 and the second air inlet can be respectively increased according to requirements to achieve a better guidance effect. In this embodiment, the first air inlet 23, the foldable member 24 and the elastic member 25 are defined as a set of booster component, and multiple sets of booster components are provided along an extending direction of the vehicle road F.

Figure 13:
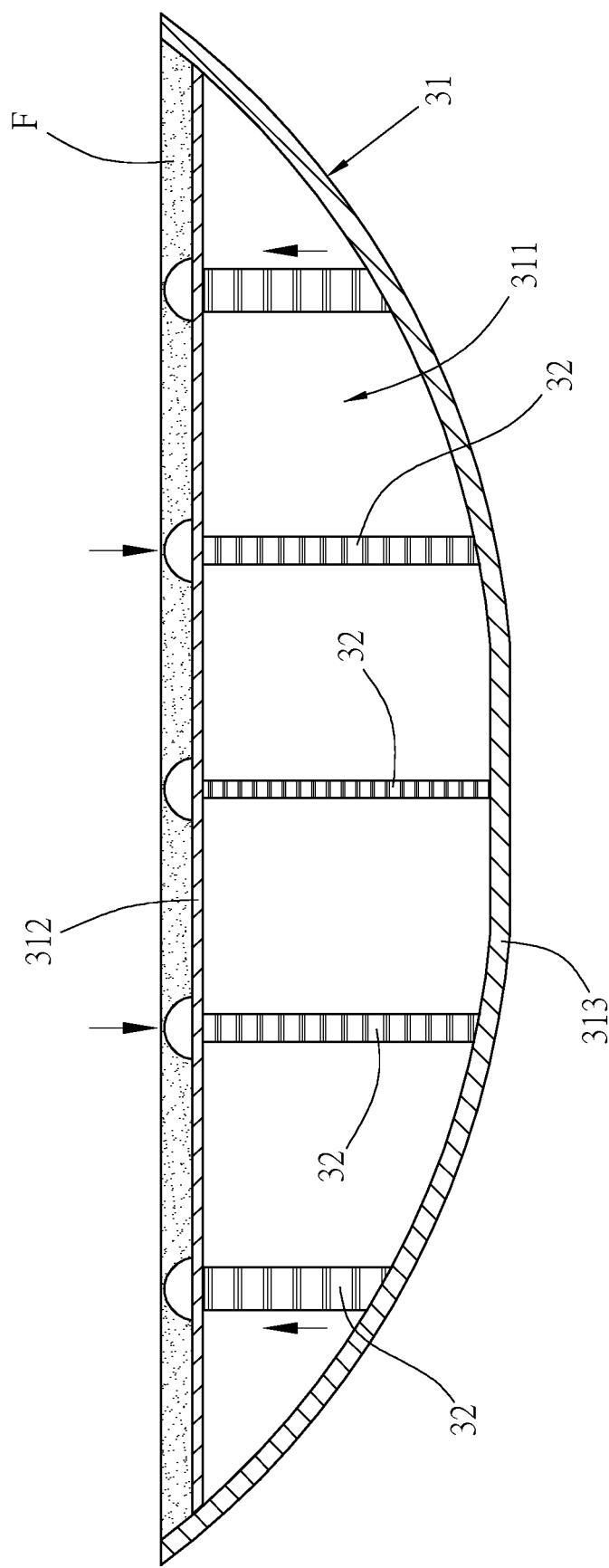
FIG. 13 is a cross-sectional view of FIG. 12 along section line 13-13.

As shown in a fifth embodiment of the invention in FIG. 12 and FIG. 13, main differences between the fifth embodiment and the first embodiment are that the arcwing circulating power guidance system further comprises a second passive booster unit 30 with a fourth pipe part 31 and a plurality of second elastic members 32, wherein an inner space of the fourth pipe part 31 is defined with a fourth flow space 311 extending along a pipe axis of the fourth pipe part 31. In this embodiment, the fourth pipe part 31 is a tubular structure, and is buried under a city road at ground level, preferably buried under the vehicle road F, and a pipe diameter of the fourth pipe part 31 is set according to a width of the vehicle road F, and the fourth pipe part 31 has an appropriate pipe wall thickness to maintain its structural strength.

In addition, as shown in FIG. 13, the fourth pipe part 31 has a top wall 312 and a bottom wall 313 connected to the top wall 312, and a vertical distance between the bottom wall 313 and the top wall 312 gradually increases from two sides of the bottom wall 313 toward a central portion of the bottom wall 313 to form a concave arc structure with two thin sides and a thick center. In particular, through the structural design of the fourth pipe part 31, an effect similar to a pressure gradient is formed inside the fourth pipe part 31, that is, the greater a gradient of the bottom wall 313, the greater a pressure gradient force, so that a pressure on the two sides of the bottom wall 313 is relatively larger, while a pressure on the central portion of the bottom wall 313 is relatively smaller, and therefore the external fluid flows continuously in a direction from high pressure to low pressure.

Furthermore, the fourth pipe part 31 can be connected to one of the guidance units shown in FIG. 5 to speed up a flow rate of the external fluid. For example, as shown in FIG. 12, the fourth pipe part 31 is connected in series with the second guidance unit 10B, so that the fourth flow space 311 and the second flow space 121B of the second guidance unit 10B communicate with each other in series. An inner space diameter of the fourth pipe part 31 is equal to or smaller than the inner space diameter of the second pipe part 12B, causing a cross-sectional area of the fourth flow space 311 in a direction perpendicular to the pipe axis of the fourth pipe part 31 equal to or smaller than a cross-sectional area of second flow space 121B in a direction perpendicular to the pipe axis of the second pipe part 12B.

In addition, an included angle between the fourth pipe part 31 and the second pipe part 12B is a fourth angle θ4, and a range of the fourth angle θ4 is between 15° to 180°. In this embodiment, the fourth angle θ4 is 15°, as shown in FIG. 12.

In addition, the fourth angle θ4 is selected to be between 15° and 60°, more preferably, the fourth angle θ4 is between 15° and 40°. Likewise, under the influence of the pressure gradient, the external fluid is continuously driven to prevent the external fluid from staying in the guidance units.

The second elastic members 32 are respectively disposed in the fourth pipe part 31 at intervals along a radial direction of the fourth pipe part 31. In this embodiment, each of the second elastic members 32 is a rope-like structure, and two ends thereof are respectively connected to the top wall 312 and the bottom wall 313, the second elastic members 32 are arranged in sequence from a side edge of the bottom wall 313 to the central portion of the bottom wall 313 in a descending order according to an elastic capacity of the second elastic members 32, and the second elastic member 32 located in a central portion of the fourth flow space 311 has a smallest elasticity, and the second elastic members 32 located at two sides of the fourth flow space 311 have a greatest elasticity.

With the composition of the above-mentioned components, a specific implementation mode of the fifth embodiment of the invention is as follows. Wherein when the vehicle C passes through the vehicle road F, a downward exerted force of the vehicle C through a wheel of the vehicle C causes each of the second elastic members 32 to be acted on by an external force to oscillate, and a surrounding fluid receives a kinetic energy of oscillation of the second elastic member 32 and fluctuates at the same time to change a fluid distribution state in the fourth pipe part 31. In detail, a degree of oscillation of each of the second elastic members 32 depends on its elasticity, that is, the greater an elasticity, the more violent an oscillation, and the greater a fluid fluctuation; on the contrary, the smaller an elasticity, the slower an oscillation, and the smaller a fluid fluctuation. Accordingly, the external fluid in the fourth flow space 311 flows from a side edge of the bottom wall 313 toward a center of the bottom wall 313 through changes in a magnitude of fluid fluctuation.

Figure 14:
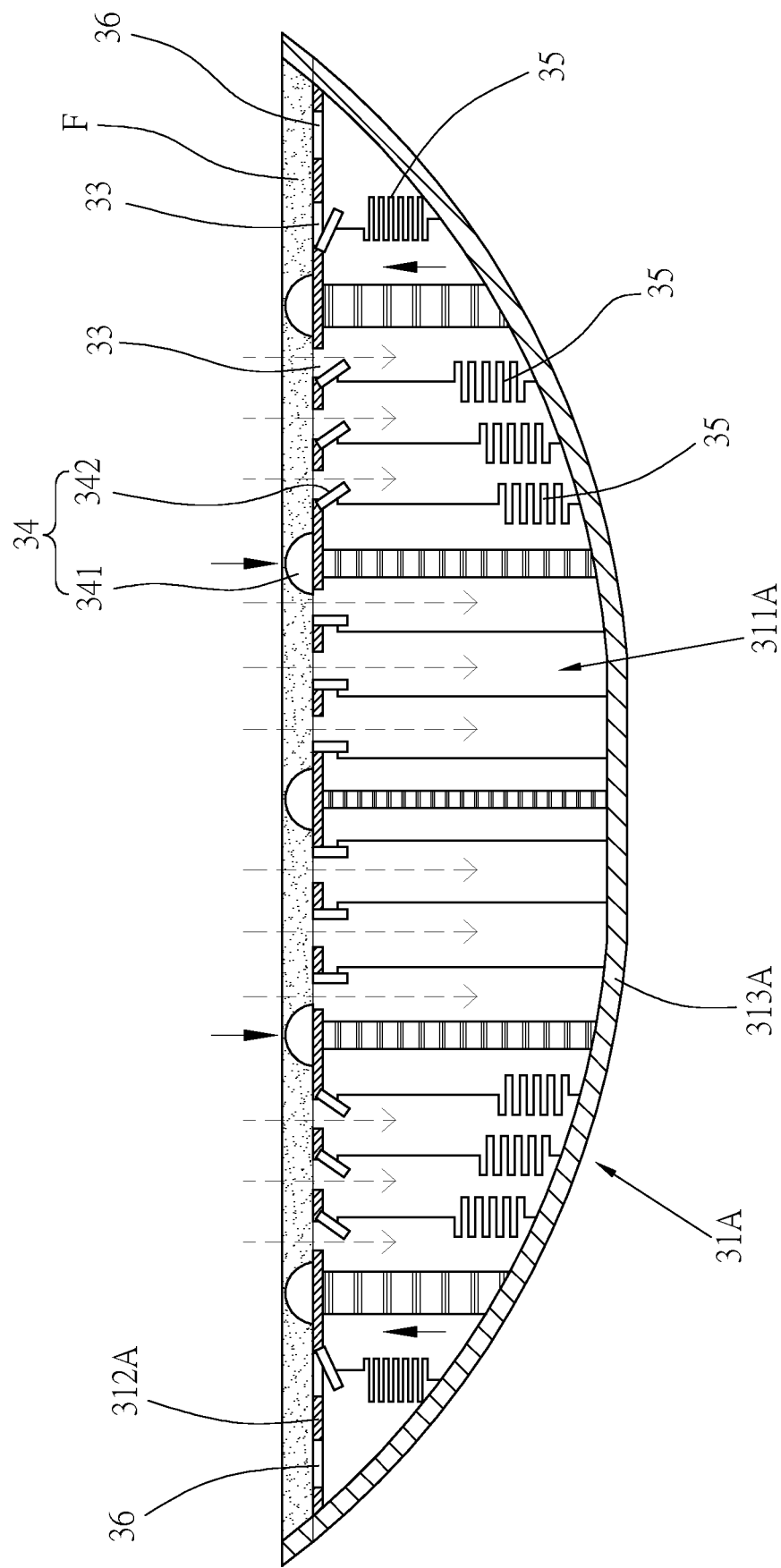
FIG. 14 is a schematic diagram of a sixth embodiment of the invention.

As shown in a sixth embodiment of the invention in FIG. 14, main differences between the sixth embodiment and the fifth embodiment are that the first passive booster unit 20A further comprises a first air inlet 33, a foldable member 34, an elastic member 35 and a second air inlet 36, wherein the first air inlets 33 are respectively opened on a fourth pipe part 31A at intervals along a pipe axis direction of the fourth pipe part 31A, and are correspondingly opened on the vehicle road F to communicate with the outside.

The foldable member 34 has a force-receiving portion 341 and a closing portion 342. The force-receiving portion 341 is disposed on the vehicle road F and is connected with the closing portion 342 by a locking mechanism, so that the closing portion 342 can be in a locked state and a released state; however, the locking mechanism is a conventional technology, so it will not be described in detail. The closing portion 342 is capable of covering the first air inlet 33 by opening and closing, so that the first air inlet 33 has a communicated state and a closed state.

The elastic member 35 is bridged between the closing portion 342 and an inner wall surface of the bottom wall 313. When a wheel of the vehicle C is pressed against the force-receiving portion 341, an external force is applied to the force-receiving portion 341, and the locking mechanism is actuated, and the closing portion 342 is changed from the locked state to the released state, so that the elastic member 35 is capable of pulling the closing portion 342 away from the first air inlet 33 partially, and the first air inlet 33 can be adjusted from the closed state to the communicated state, the external fluid is enabled to enter into the fourth flow space 311 through the first air inlet 33, as shown in FIG. 14. Conversely, when the vehicle C wheel leaves the foldable member 34, the closing portion 342 will return to an original position to close the first air inlet 33.

The second air inlet 36 is further opened on one side of the fourth pipe part 31, so that an inside of the fourth pipe part 31 is normally communicated with the outside.

In addition, a quantity of the first air inlet 33, the foldable member 34, the elastic member 35 and the second air inlet 36 can be respectively increased according to requirements to achieve a better guidance effect. In this embodiment, the first air inlet 33, the foldable member 34 and the elastic member 35 are defined as a set of booster component, and multiple sets of booster components are provided along an extending direction of the vehicle road F.

The above-mentioned embodiments are merely used to illustrate the technical ideas and features of the invention, with an object to enable any person having ordinary skill in the art to understand the technical content of the invention and implement it accordingly, the embodiments are not intended to limit the Claims of the invention, and all other equivalent changes and modifications completed based on the technical means disclosed in the invention should be included in the Claims covered by the invention.

What is claimed is:

1. An arcwing circulating power guidance system comprising:
   two guidance units comprising:
   a first pipe part, an inner space of the first pipe part being defined with a first flow space extending along a pipe axis of the first pipe part; and
   a second pipe part, an inner space of the second pipe part being defined with a second flow space extending along a pipe axis of the second pipe part, and an inner space diameter of the second pipe part being smaller than an inner space diameter of the first pipe part, causing a cross-sectional area of the second flow space in a direction perpendicular to the pipe axis of the second pipe part smaller than a cross-sectional area of the first flow space in a direction perpendicular to the pipe axis of the first pipe part;
   one end of the pipe axis of the second pipe part and one end of the pipe axis of the first pipe part connecting in series with each other and being spaced apart from each other by a first angle, so that the second flow space and the first flow space communicating with each other in series; and
   thereby, a pressure of an external fluid located in the second flow space being greater than a pressure of the external fluid located in the first flow space to cause the external fluid to flow continuously from the second flow space to the first flow space;
   a first guidance unit of the two guidance units comprising the first pipe part and the second pipe part; and
   a second guidance unit of the two guidance units communicating in series with the first guidance unit, and comprising the first pipe part and the second pipe part;
   wherein another end of the pipe axis of the first pipe part of the second guidance unit and another end of the pipe axis of the second pipe part of the first guidance unit are connected in series with each other and spaced apart from each other by a second angle, so that the first flow space of the second guidance unit and the second flow space of the first guidance unit communicate with each other in series.

2. The arcwing circulating power guidance system as claimed in claim 1, wherein the second angle is between 15° and 180°.

3. The arcwing circulating power guidance system as claimed in claim 1, wherein a cross-sectional area of the first flow space of the second guidance unit in a direction perpendicular to the pipe axis of the first pipe part is smaller than a cross-sectional area of the first flow space of the first guidance unit in a direction perpendicular to the pipe axis of the first pipe part, and a cross-sectional area of the second flow space of the second guidance unit in a direction perpendicular to the pipe axis of the second pipe part is smaller than a cross-sectional area of the second flow space of the first guidance unit in a direction perpendicular to the pipe axis of the first pipe part.

4. The arcwing circulating power guidance system as claimed in claim 1, further comprising a first passive booster unit comprising:
   a third pipe part, an inner space of the third pipe part being defined with a third flow space extending along a pipe axis of the third pipe part, and the third flow space communicating with either the first guidance unit or the second guidance unit; and
   a movable part movably disposed in the third pipe part to partition the third flow space into at least two fluid temporary retaining areas; wherein when the movable part is acted on by an external force, the movable part displaces and actuates relative to the third pipe part and changes a space size of the at least two fluid temporary retaining areas in order to drive the external fluid located in the fluid temporary retaining areas to flow.

5. The arcwing circulating power guidance system as claimed in claim 4, wherein the movable part comprises:

a flexible body part in the shape of an elongated sheet extending along the pipe axis direction of the third pipe part;

a plurality of first connecting parts respectively disposed on the body part at intervals along the pipe axis direction of the third pipe part; and a plurality of first elastic members respectively bridged between each of the first connecting parts and the third pipe part, through changes of an elastic force of the first elastic members, the body part is forced to bend to form a continuous wavy structure along a cross section of the pipe axis direction of the third pipe part, and at the same time, portions of the body part at troughs of the wavy shape are respectively attached on an inner wall surface of the third pipe part, thereby the fluid temporary retaining areas are partitioned; wherein when each of the first elastic members is acted on by an external force, an elastic state of each of the first elastic members is changed to cause each of the first connecting parts to displace linearly back and forth between a first position and a second position, so that the body part partially displaces and actuates relative to the third pipe part, thereby changing a space size of the corresponding fluid temporary retaining area.

6. The arcwing circulating power guidance system as claimed in claim 5, wherein the first passive booster unit further comprises:
a first air inlet opened on the third pipe part along the pipe axis direction of the third pipe part;
a foldable member capable of covering the first air inlet by opening and closing, so that the first air inlet has a communicated state and a closed state; wherein when the first air inlet is adjusted from the closed state to the communicated state, the external fluid is enabled to enter into the fluid temporary retaining area through the first air inlet;
a second connecting part spaced apart from the first connecting parts and disposed on the body part along the pipe axis direction of the third pipe part; and
an elastic member bridged between the foldable member and the second connecting part.

7. The arcwing circulating power guidance system as claimed in claim 6, wherein the first passive booster unit further comprises a second air inlet away from the first air inlet and disposing on the third pipe part, so that an inside of the third flow space is normally communicated with the outside.

8. The arcwing circulating power guidance system as claimed in claim 1, further comprising a second passive booster unit comprising:
a fourth pipe part, an inner space of the fourth pipe part being defined with a fourth flow space extending along a pipe axis of the fourth pipe part, and the fourth flow space communicating with either the first guidance unit or the second guidance unit; and
a plurality of second elastic members respectively disposed in the fourth pipe part at intervals along a radial direction of the fourth pipe part; wherein when each of the second elastic members is acted on by an external force to oscillate, each of the second elastic members is capable of transmitting a kinetic energy to the external fluid around each of the second elastic members to cause fluctuation, and the external fluid in the fourth flow space is caused to flow with changes of fluctuation.

9. The arcwing circulating power guidance system as claimed in claim 8, wherein the fourth pipe part has a top wall and a bottom wall connected to the top wall, and a vertical distance between the bottom wall and the top wall gradually increases from two sides of the bottom wall toward a central portion of the bottom wall.

10. The arcwing circulating power guidance system as claimed in claim 9, wherein each of the second elastic members is a rope-like structure, and two ends thereof are respectively connected to the top wall and the bottom wall.

11. The arcwing circulating power guidance system as claimed in claim 10, wherein the second elastic members are arranged in sequence from a side edge of the bottom wall to the central portion of the bottom wall in a descending order according to an elastic capacity of the second elastic members.

12. The arcwing circulating power guidance system as claimed in claim 11, wherein the second passive booster unit further comprises:
a first air inlet opened on the fourth pipe part along a pipe axis direction of the fourth pipe part;
a foldable member capable of covering the first air inlet by opening and closing, so that the first air inlet has a communicated state and a closed state; wherein when the first air inlet is adjusted from the closed state to the communicated state, the external fluid is enabled to enter into the fourth flow space through the first air inlet; and
an elastic member bridged between the foldable member and an inner wall surface of the bottom wall.

13. The arcwing circulating power guidance system as claimed in claim 12, wherein the second passive booster unit further comprises a second air inlet away from the first air inlet and disposing on the fourth pipe part, so that the fourth flow space is normally communicated with the outside.

14. An arcwing circulating power guidance system comprising:
two guidance units comprising:
a first pipe part, an inner space of the first pipe part being defined with a first flow space extending along a pipe axis of the first pipe part; and
a second pipe part, an inner space of the second pipe part being defined with a second flow space extending along a pipe axis of the second pipe part, and an inner space diameter of the second pipe part being smaller than an inner space diameter of the first pipe part, causing a cross-sectional area of the second flow space in a direction perpendicular to the pipe axis of the second pipe part smaller than a cross-sectional area of the first flow space in a direction perpendicular to the pipe axis of the first pipe part;
one end of the pipe axis of the second pipe part and one end of the pipe axis of the first pipe part connecting in series with each other and being spaced apart from each other by a first angle, so that the second flow space and the first flow space communicating with each other in series; and
thereby, a pressure of an external fluid located in the second flow space being greater than a pressure of the external fluid located in the first flow space to cause the external fluid to flow continuously from the second flow space to the first flow space;
wherein the first angle is between 15° and 180°;
a first guidance unit of the two guidance units comprising the first pipe part and the second pipe part; and
a second guidance unit of the two guidance units communicating in series with the first guidance unit, and comprising the first pipe part and the second pipe part.

15. The arcwing circulating power guidance system as claimed in claim 14, wherein another end of the pipe axis of the first pipe part of the second guidance unit and another end of the pipe axis of the second pipe part of the first guidance unit are connected in series with each other and spaced apart from each other by a second angle, so that the first flow space of the second guidance unit and the second flow space of the first guidance unit communicate with each other in series.

16. The arcwing circulating power guidance system as claimed in claim 15, wherein the second angle is between 15° and 180°.

17. The arcwing circulating power guidance system as claimed in claim 15, wherein a cross-sectional area of the first flow space of the second guidance unit in a direction perpendicular to the pipe axis of the first pipe part is smaller than a cross-sectional area of the first flow space of the first guidance unit in a direction perpendicular to the pipe axis of the first pipe part, and a cross-sectional area of the second flow space of the second guidance unit in a direction perpendicular to the pipe axis of the second pipe part is smaller than a cross-sectional area of the second flow space of the first guidance unit in a direction perpendicular to the pipe axis of the first pipe part.

18. The arcwing circulating power guidance system as claimed in claim 14, further comprising a first passive booster unit comprising:
a third pipe part, an inner space of the third pipe part being defined with a third flow space extending along a pipe axis of the third pipe part, and the third flow space communicating with either the first guidance unit or the second guidance unit; and
a movable part movably disposed in the third pipe part to partition the third flow space into at least two fluid temporary retaining areas; wherein when the movable part is acted on by an external force, the movable part displaces and actuates relative to the third pipe part and changes a space size of the at least two fluid temporary retaining areas in order to drive the external fluid located in the fluid temporary retaining areas to flow.

19. The arcwing circulating power guidance system as claimed in claim 18, wherein the movable part comprises:
a flexible body part in the shape of an elongated sheet extending along the pipe axis direction of the third pipe part;
a plurality of first connecting parts respectively disposed on the body part at intervals along the pipe axis direction of the third pipe part; and
a plurality of first elastic members respectively bridged between each of the first connecting parts and the third pipe part, through changes of an elastic force of the first elastic members, the body part is forced to bend to form a continuous wavy structure along a cross section of the pipe axis direction of the third pipe part, and at the same time, portions of the body part at troughs of the wavy shape are respectively attached on an inner wall surface of the third pipe part, thereby the fluid temporary retaining areas are partitioned; wherein when each of the first elastic members is acted on by an external force, an elastic state of each of the first elastic members is changed to cause each of the first connecting parts to displace linearly back and forth between a first position and a second position, so that the body part partially displaces and actuates relative to the third pipe part, thereby changing a space size of the corresponding fluid temporary retaining area.

20. The arcwing circulating power guidance system as claimed in claim 19, wherein the first passive booster unit further comprises:
a first air inlet opened on the third pipe part along the pipe axis direction of the third pipe part;
a foldable member capable of covering the first air inlet by opening and closing, so that the first air inlet has a communicated state and a closed state; wherein when the first air inlet is adjusted from the closed state to the communicated state, the external fluid is enabled to enter into the fluid temporary retaining area through the first air inlet;
a second connecting part spaced apart from the first connecting parts and disposed on the body part along the pipe axis direction of the third pipe part; and
an elastic member bridged between the foldable member and the second connecting part.

21. The arcwing circulating power guidance system as claimed in claim 20, wherein the first passive booster unit further comprises a second air inlet away from the first air inlet and disposing on the third pipe part, so that an inside of the third flow space is normally communicated with the outside.

22. The arcwing circulating power guidance system as claimed in claim 14, further comprising a second passive booster unit comprising:
a fourth pipe part, an inner space of the fourth pipe part being defined with a fourth flow space extending along a pipe axis of the fourth pipe part, and the fourth flow space communicating with either the first guidance unit or the second guidance unit; and
a plurality of second elastic members respectively disposed in the fourth pipe part at intervals along a radial direction of the fourth pipe part; wherein when each of the second elastic members is acted on by an external force to oscillate, each of the second elastic members is capable of transmitting a kinetic energy to the external fluid around each of the second elastic members to cause fluctuation, and the external fluid in the fourth flow space is caused to flow with changes of fluctuation.

23. The arcwing circulating power guidance system as claimed in claim 22, wherein the fourth pipe part has a top wall and a bottom wall connected to the top wall, and a vertical distance between the bottom wall and the top wall gradually increases from two sides of the bottom wall toward a central portion of the bottom wall.

24. The arcwing circulating power guidance system as claimed in claim 23, wherein each of the second elastic members is a rope-like structure, and two ends thereof are respectively connected to the top wall and the bottom wall.

25. The arcwing circulating power guidance system as claimed in claim 24, wherein the second elastic members are arranged in sequence from a side edge of the bottom wall to the central portion of the bottom wall in a descending order according to an elastic capacity of the second elastic members.

26. The arcwing circulating power guidance system as claimed in claim 25, wherein the second passive booster unit further comprises:
a first air inlet opened on the fourth pipe part along a pipe axis direction of the fourth pipe part;
a foldable member capable of covering the first air inlet by opening and closing, so that the first air inlet has a communicated state and a closed state; wherein when the first air inlet is adjusted from the closed state to the communicated state, the external fluid is enabled to enter into the fourth flow space through the first air inlet; and an elastic member bridged between the foldable member and an inner wall surface of the bottom wall.

27. The arcwing circulating power guidance system as claimed in claim 26, wherein the second passive booster unit further comprises a second air inlet away from the first air inlet and disposing on the fourth pipe part, so that the fourth flow space is normally communicated with the outside.

28. The guidance unit as claimed in claim 1, wherein the first angle is between 15° and 180°.

* * * * *